United States Patent [19]

Furrer et al.

[11] Patent Number: 4,826,518

[45] Date of Patent: May 2, 1989

[54] FILTER ASSEMBLY FOR A BOILER FILTER HOUSING

[75] Inventors: Jürgen Furrer; Konstantin Jannakes, both of Eggenstein-Leopoldshafen; Georg Potgeter, Karslruhe, all of Fed. Rep. of Germany

[73] Assignee: Kernforschungszentrum Karlsruhe GmbH, Karlsruhe, Fed. Rep. of Germany

[21] Appl. No.: 72,091

[22] Filed: Jul. 10, 1987

[30] Foreign Application Priority Data

Jul. 11, 1986 [DE] Fed. Rep. of Germany ....... 3623346

[51] Int. Cl.[4] ............................................. B01D 46/00
[52] U.S. Cl. ........................................ 55/484; 55/498; 55/521
[58] Field of Search ................. 55/521, 498, 484, 483; 210/493.3, 493.1, 493.5

[56] References Cited

U.S. PATENT DOCUMENTS 1,458,657  6/1923  La Rose ................................. 55/498
4,154,688  5/1979  Pall ....................................... 55/498

FOREIGN PATENT DOCUMENTS 1022232  3/1966  United Kingdom .................. 55/521

*Primary Examiner*—Bernard Nozick
*Attorney, Agent, or Firm*—Spencer & Frank

[57] ABSTRACT

A filter assembly includes a frame shaped generally as a circular cylinder and having an inlet opening at one end for orienting fluid axially; and a plurality of filter elements arranged in a circular array about the frame and being supported thereby. The filter elements are arranged for allowing passage of fluid therethrough radially outwardly. The circumferentially adjoining filter elements define a space therebetween. Angled spacer elements bridge and maintain the space between any two adjoining filter elements. Each filter element is sealed relative to the frame. The filter elements constitute interconnected blocks of a single filtering unit formed of a continuously folded strip-like filter material, and adjoining blocks of the filtering unit are angled to one another to present a polygonal pattern as a whole, whereby the flanking blocks of the filtering unit are in a contacting relationship and free ends of the filter material in the flanking blocks are bonded to one another.

4 Claims, 2 Drawing Sheets

FILTER ASSEMBLY FOR A BOILER FILTER HOUSING

BACKGROUND OF THE INVENTION

This invention relates to a filter assembly for use as a filter insert in a boiler filter housing, particularly for purifying exhaust (waste) gases of nuclear installations. The filter insert is of the type which has a frame having the shape of a circular cylinder provided with a central inlet opening at its underside and containing individual filter elements which are distributed over the external circumference of the frame and through which fluid may pass from the inside outwardly. The intermediate spaces between the filter elements are bridged by sheet metal spacer/holder members and the filter elements are seated in a sealed manner relative to the cylindrical frame.

For purifying exhaust gases, particularly those generated in nuclear installations such as reprocessing installations for nuclear fuels, by separating suspended materials therefrom, filter inserts of the Special Stage S are necessary. The filter inserts have to be structured such that dependent upon the activity inventory of the utilized filter inserts, that is, dependent upon the purpose of use, the replacement of the filter insert can be performed either manually with the aid of the plastic bag technique or by remote control. The seal of the filter seat between the air to be filtered (raw air) and the filtered air (purified air) is, as a rule, monitored during operation.

For use with a remote servicing there have been utilized rectangular filters secured by screws to a five-sided frame and individually sealed for obtaining a quasi-circular filter insert. The five-sided frame is a welded construction. To five webs which form the frame for the rectangular filter inserts there are welded in a gastight manner the lid and the bottom of the circular filter insert. The filter bottom is provided with a gas inlet opening. In the quasi-circular filters which are formed of a plurality of rectangular filter inserts secured to the filter frame and sealed all around, the sealing properties of the annular, all-around seal which may have a length of several meters, cannot be verified. The welded seams of the filter insert also have a length of several meters.

SUMMARY OF THE INVENTION

It is an object of the invention to provide an improved filter insert of the above-outlined type from which the discussed disadvantages are eliminated.

In particular, it is an object of the invention to provide a possibility of monitoring, during filtering operation, the seals associated with the filter insert.

It is a further object of the invention to provide a filter insert of small weight and of compressibility to ensure a small volume for the final storage and of a construction which permits replacement by remote control in its housing without environmental contamination.

Thus, the overall object of the invention is to provide a remotely serviceable suspension substance filter insert of polygonal configuration in the Special Stage S for purifying exhaust gases emanating from nuclear installations, wherein the sealed seats can be monitored and which has a small waste weight and volume.

These objects and others to become apparent as the specification progresses, are accomplished by the invention, according to which, briefly stated, the filter assembly includes a frame shaped generally as a circular cylinder and having an inlet opening at one end for orienting fluid axially; and a plurality of filter elements arranged in a circular array about the frame and being supported thereby. The filter elements are arranged for allowing passage of fluid therethrough radially outwardly. The circumferentially adjoining filter elements define a space therebetween. Angled spacer elements bridge and maintain the space between any two adjoining filter elements. Each filter element is sealed relative to the frame. The filter elements constitute interconnected blocks of a single filtering unit formed of a continuously folded strip-like filter material, and adjoining blocks of the filtering unit are angled to one another to present a polygonal pattern as a whole, whereby the flanking blocks of the filtering unit are in a contacting relationship and free ends of the filter material in the flanking blocks are bonded to one another.

Thus, according to the invention, a commercially available rectangular glass fiber paper filtering unit prepared by unfolding the filter material and interposing spacers between the blocks is inserted into the circular filter frame by means of a device in such a manner that the filter frame is, by attaching thereto the V-shaped spacers, subdivided into several equally sized rectangular components or filter chambers or filter blocks without interrupting the filter material. The ends of the first and the last block of the filtering unit obtained by virtue of the circular arrangement are glued to one another. The width of the rectangular filter components at the inner and outer radius is of the same magnitude. The V-shaped spacers between the filter blocks are pressed or glued to the face of the filter material and stabilize the latter against being blown out by gas pressure or gas quantity fluctuations. The non-purified air (raw air) is admitted into the filter insert through the bottom opening thereof, and then it flows radially outwardly through the filter paper and leaves the filter insert as purified air. The filter insert is equipped with a generally mushroom-shaped grasping post and may be replaced directly in situ or by remote control. The seal for separating the raw air from the purified air in the filter housing is mounted on the filter insert and it may be a flat seal or a shaped seal.

A particular advantage of the invention resides in that it combines the advantages of rectangular and circular filter inserts, while avoiding the construction-specific disadvantages thereof. By virtue of the lightweight construction, the high-grade steel material required for the flter frame which has to be placed in final storage as waste material may be maintained at small quantities. The final storage volume is small, since the filter inserts may be compressed to a significant extent. The used filter insert may be compressed approximately to one-third of its original volume. The filter insert frame is not a welded construction and may therefore be manufactured inexpensively. The locations to be sealed to separate raw air from clean air are minimized in the structure according to the invention thus increasing the operational safety of the filter. The fluidtight properties of the filter seal may be monitored before and during the filtering operation. Only a single filter seal is required for the fluidtight separation between raw air and clean air. The filter insert according to the invention, as opposed to prior art filter arrangements, no longer requires welded seams which had to have sealing properties.

DESCRIPTION OF THE PREFERRED EMBODIMENT

Figure 1:
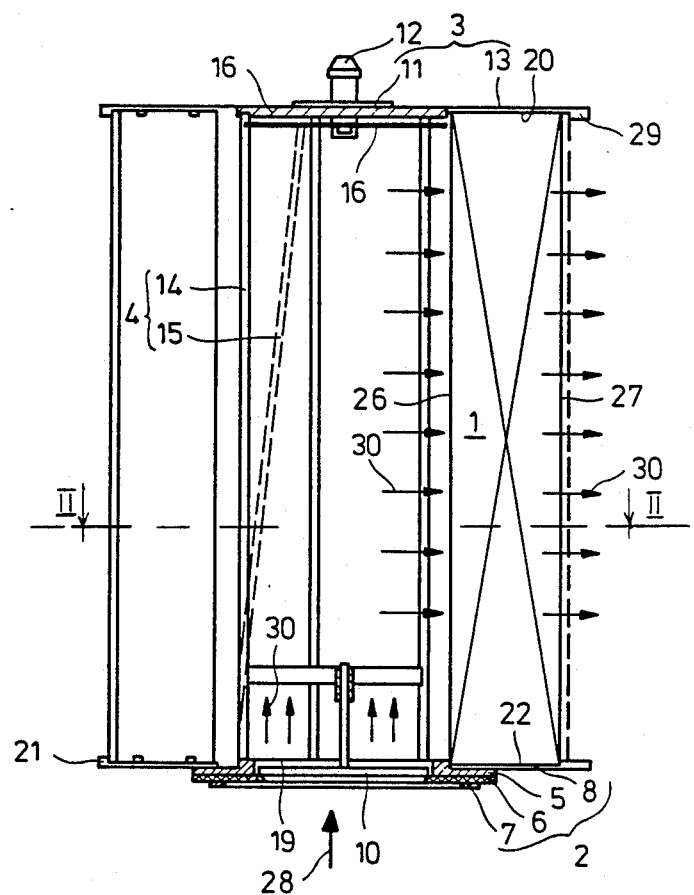
FIG. 1 is a schematic axial sectional view of a preferred embodiment of the invention.
Figure 2:
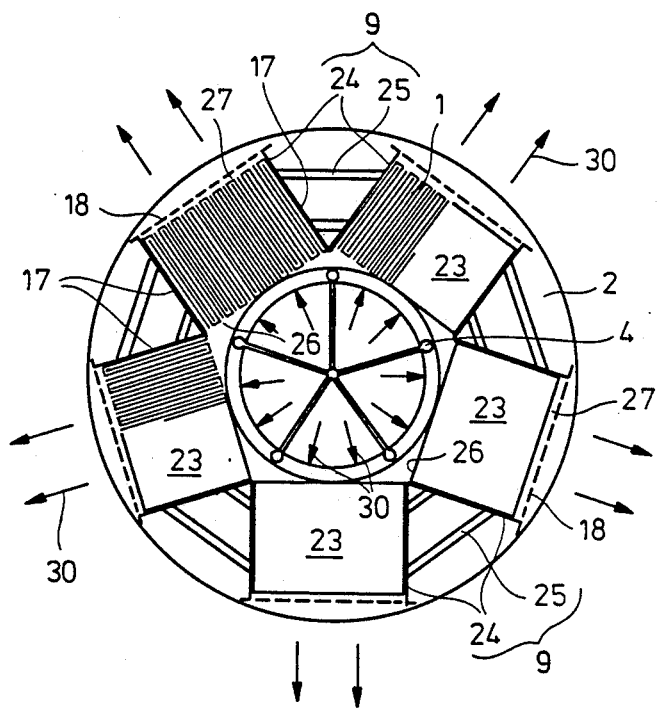
FIG. 2 is a schematic sectional view tken along line II—II of FIG. 1.

Turning now to FIGS. 1 and 2, the filter insert shown therein is arranged to be traversed by a gas to be filtered in the direction of arrows 30. The filter insert comprises a filtering medium 1 made of glass fiber paper as well as a frame for supporting the filter medium 1. The frame has a bottom assembly 2, a lid assembly 3 and a support assembly 4 connecting the bottom and lid assemblies to one another in a spaced relationship.

The bottom assembly 2 comprises a pressure plate 5 to which there is glued the seat seal 6 additionally secured by a holding ring 7, as well as a sheet metal bottom 8. Both sides of the seal, that is, the glued side and the countersupported side are monitored for fluidtightness during operation.

The sheet metal bottom 8 is secured to the pressure plate 5 and is provided with an external peripheral crimped edge 21. The lower end faces 22 of the filter medium 1 and the V-spacers 9 are embedded in a special cast mass in the sheet metal bottom 8.

As it may be observed in FIG. 2, the V-spacers 9 are situated between the circumferentially distributed rectangular individual filter blocks 23 and are formed of V-shaped sheet metal angle members 24 which are positioned and stiffened relative to one another by virtue of strut members (bars) 25. The angled sheet parts 24 are so designed that five rectangular filter blocks 23 may be distributed in a circular array, with a precise radial orientation of their inlet and outlet sides 26 and 27, respectively.

The V-spacers 9 are secured to the sheet metal bottom 8 and the sheet metal lid 13. The filter paper of the filter medium 1 which has an endless course and whose two ends are glued to one another, is, with the aid of the V-spacers 9, divided into the individual filter blocks 23 which are of identical width at their inlet and outlet sides 26 and 27 respectively. By virtue of the V-spacers 9 the filter paper is compressed to such an extent that it cannot be blown out by pressure or gas quantity fluctuations. As an initial material for the block portions 23 there may be used a commercially available filtering unit made, for example, of a continuous glass fiber strip. The unit is opened up in sections which are pivoted away from one another, whereby the blocks 23 are formed. The individual blocks 23 are thus arranged polygonally in a circular pattern and the meeting ends of the first and last block (flanking blocks) are glued to one another.

In order to further improve the protection of the filter paper 1 against the above-noted pressure fluctuations, the V-spacers 9 are not only pressed against the filter paper but may be glued thereto by means of an adhesive face 17. On the outer face of the filter blocks 23 the filter paper 1 is secured by means of a grid 18 affixed to the V-spacers 9. For particular purposes the inner face of the filter blocks 23 may also be provided with a grid (not shown). The entire filter insert may comprise a desired number of filter blocks 23; usually five filter blocks 23 are being considered as the optimum number.

For a gas flow rate of approximately 3,000 m³/h the outer diameter of the entire filter insert is 580 mm and its height is 900 mm.

The bottom opening 19 for the gas inlet 28 is tightly closed with a closure plate 10 during storage.

The lid assembly 3 comprises a pressure plate 11 on which there is mounted a generally mushroom-shaped carrier post 12 for lifting and carrying the filter and a sheet metal lid 13 which is provided with a crimped peripheral edge 29. The upper end faces 20 of the blocks 23 and the V-spacers 9 are embedded in a special cast mass in the sheet metal lid 13.

The supporting assembly 4 comprises five pipes 14 which are secured to the pressure plates 5 and 11 of the bottom and lid assemblies 2 and 3, respectively, whereby the filter frame constitutes a solid, rigid unit. The force transmission from the lid assembly 3 to the bottom seal 6 is effected by means of the pipes 14 which may be arranged axially or at an inclination to the filter axis (as shown at 15) and are centered by means of a disc 16.

In summary, the essential features of the new filter assembly reside in the fact that the individual filter elements form a group of interconnected blocks 23 of a filter unit made of a continuous, band-like filter material 1. The unit is opened into square blocks 23 which are arranged polygonally in a circular pattern and the meeting free ends of the filter unit are glued to one another.

It will be understood that the above description of the present invention is susceptible to various modifications, changes and adaptations, and the same are intended to be comprehended within the meaning and range of equivalents of the appended claims.

What is claimed is:

1. In a filter assembly including a frame shaped generally as a circular cylinder; means defining an inlet opening at one end of the frame for orienting fluid axially into the frame; a plurality of filter elements arranged in a circular array about the frame and being supported thereby; said filter elements being arranged for allowing passage of fluid therethrough radially outwardly; circumferentially adjoining filter elements defining a space therebetween; and sealing means for sealing said filter elements against said frame; the improvement wherein said frame comprises a lid assembly including a first pressure plate and a bottom assembly including a second pressure plate; said first and second pressure plates being oriented perpendicularly to the axis of the cylindrical frame; said frame further comprising a plurality of support pipes secured to said first and second pressure plates and extending from the first pressure plate to the second pressure plate; said pipes being axially readily compressible by external forces applied axially to said pressure plates.

2. A filter assembly as defined in claim 1, further comprising angled spacer elements bridging and maintaining the space between any two adjoining filter elements; and further wherein said filter elements constitute interconnected blocks of a single filtering unit formed of a continuously folded strip of filter material; adjoining blocks of said filtering unit being angled to one another to present a polygonal pattern as a whole, whereby the flanking blocks of said filtering unit are in a contacting relationship and free ends of the filter material in the flanking blocks are bonded to one another.

3. A filter assembly as defined in claim 2, wherein said frame includes a lid and a base oriented radially and being spaced axially from one another; said blocks and said spacer elements being sealingly embedded in a cast mass in said lid and said base.

4. A filter assembly as defined in claim 2, wherein each said spacer element has a V-shaped cross section and opposite outer faces being adhesively bonded to respective adjoining blocks.

* * * * *

UNITED STATES PATENT AND TRADEMARK OFFICE
CERTIFICATE OF CORRECTION

PATENT NO. : 4,826,518

DATED : May 2, 1989

INVENTOR(S) : Jürgen Furrer et al

It is certified that error appears in the above-identified patent and that said Letters Patent is hereby corrected as shown below:

On the title page

In the heading of the patent, under [75], the second inventor's last name should read --Jannakos--.

Signed and Sealed this

Thirtieth Day of January, 1990

*Attest:*

JEFFREY M. SAMUELS

*Attesting Officer*     *Acting Commissioner of Patents and Trademarks*